United States Patent [19]

Lal et al.

[11] 4,301,259

[45] Nov. 17, 1981

[54] LINEAR ORGANO CARBONATE COUPLING AGENTS FOR LIVING POLYMERS OF CONJUGATED DIENES

[75] Inventors: Joginder Lal, Akron; Michael L. Senyek, Tallmadge, both of Ohio

[73] Assignee: The Goodyear Tire & Rubber Company, Akron, Ohio

[21] Appl. No.: 153,122

[22] Filed: May 27, 1980

[51] Int. Cl.$^3$ .................. C08F 8/34; C08F 36/04
[52] U.S. Cl. ........................... 525/334; 525/314; 525/343; 525/353; 525/383; 525/384; 525/386; 526/181; 526/183; 526/335
[58] Field of Search ............... 525/386, 384, 343, 353, 525/383, 334, 333; 526/181, 335, 183

[56] References Cited

U.S. PATENT DOCUMENTS

| | | | |
|---|---|---|---|
| 3,594,452 | 7/1971 | De La Mare et al. | 525/386 |
| 3,639,519 | 2/1972 | Hsieh et al. | 525/386 |
| 3,651,025 | 3/1973 | Bean et al. | 525/386 |
| 4,238,576 | 12/1980 | Trepka | 525/386 |

FOREIGN PATENT DOCUMENTS 992210  5/1965  United Kingdom.

*Primary Examiner*—William F. Hamrock
*Attorney, Agent, or Firm*—J. Y. Clowney

[57] ABSTRACT

New compositions and a process for the preparation of conjugated diene polymers of broadened molecular weight distribution by reacting non-terminated lithium catalyzed conjugated diene polymers with linear organic compounds selected from the group of carbonates, thiocarbonates and sulfites. The resulting new compositions are suitable for use in making high impact plastics and for fabricating rubber goods.

10 Claims, No Drawings

LINEAR ORGANO CARBONATE COUPLING AGENTS FOR LIVING POLYMERS OF CONJUGATED DIENES

FIELD OF THE INVENTION

This invention relates to new compositions and to a method of preparing branched polymers of conjugated dienes or branched block copolymers of vinyl-substituted aromatic compounds and conjugated dienes, which possess one or more of the following attributes: broadened molecular weight distribution, enhanced Mooney viscosity, negligible cold flow, increased styrene solution viscosity and good processability. This is accomplished by reacting organoalkali metal or organomagnesium catalyzed non-terminated polymers or block copolymers of conjugated dienes with linear organic compounds selected from the group of carbonates, thiocarbonates and sulfites.

BACKGROUND OF THE INVENTION

U.S. Pat. No. 3,135,716 teaches the preparation of terminally reactive polymers through the reaction of living (i.e. non-terminated) polymers with reagents such as oxygen, sulfur, halogen, sulfuryl chloride, carbon disulfide, carbon dioxide, and carbonyl chloride.

U.S. Pat. No. 3,598,887 teaches a process for making multiblock copolymers by coupling living block copolymers with carbon dioxide, carbonyl sulfide, or carbon disulfide.

U.S. Pat. No. 3,281,383 teaches a method of making a branched polymer by reacting a monolithium non-terminated polymer with a compound having at least three reactive sites capable of reacting with the carbon-lithium bond to produce a "radial" polymer, i.e. a polymer having long chain branches. The types of treating compounds, used included polyepoxides, polyisocyanates, polyimines, polyaldehydes, polyketones, polyanhydrides, polyesters, and polyhalides.

U.S. Pat. No. 3,349,071 teaches a process for reducing the cold flow of diene polymers by terminating lithium catalyzed diene polymers with carbon disulfide.

U.S. Pat. No. 3,427,364 teaches a process for preparing polymers of increased molecular weight by reacting lithium catalyzed non-terminated homopolymers and copolymers of conjugated dienes and mono-vinyl arenes with carbon monoxide as a coupling agent.

In the *Journal of Polymer Science*, A-1, 6 859 (1968) there is reported the use of diethylcarbonate in an attempt to couple "living" lithium polystyrene for the formation of a ketone-containing polymers, i.e.,

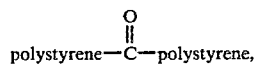

which could be further used for a grafting reaction. With "living" lithium polystyrene of viscosity average molecular weight, $\overline{M}v$, of 31,500, and an equivalent amount of diethyl carbonate, there was obtained a very modest increase in $\overline{M}v$ to 42,800. However, the fractionated polymer from the diethyl carbonate reaction yielded very little graft polymer and therefore, it was concluded in this article that diethyl carbonate was ineffective as a coupling agent. The product resulting from the reaction of "living" lithium α-methylstyrene polymer of $\overline{M}v=31,500$ and diethyl carbonate has $\overline{M}v=29,200$, representing no coupling. No mention is made of conjugated diene polymers in this article, nor are any additional data or discussion given which would even suggest that diethyl carbonate could function successfully as a coupling agent for broadening the molecular weight distribution of "living" lithium polydienes.

The present invention relates to new compositions and to a process for making conjugated diene polymers having one or more of the following features: broadened molecular weight distribution, enhanced Mooney viscosity, negligible cold flow, and better processability. In another aspect, it relates to a process for preparing branched copolymers having broadened molecular weight distribution and negligible cold flow. During packaging, shipping and storage of elastomeric hydrocarbon polymers, the tendency of these materials to undergo cold flow in the unvulcanized state can present severe handling difficulties. If a package of polymer is punctured, the resulting polymer can flow out, leading to product loss, contamination, or sticking of packages together. Furthermore, hydrocarbon polymers of conjugated dienes of relatively high Mooney viscosities are frequently difficult to process. Their low Mooney viscosity counterparts on the other hand have a tendency to cold flow in the uncured state. This restricts the use of hydrocarbon polymers of conjugated dienes in the manufacture of high impact plastics, such as polystyrene. Linear polybutadienes frequently do not possess the necessary combination of rheological and viscosity properties such as Mooney viscosity, styrene solution viscosity, and cold flow needed in the manufacture of reinforced polystyrene.

We have discovered that the treatment of organolithium catalyzed non-terminated conjugated diene polymers with linear organic carbonates, linear thiocarbonates and linear sulfites produces new polymers possessing broadened molecular weight, enhanced Mooney viscosities, negligible cold flow and greater styrene solution viscosities compared to the untreated polymers. The polymers resulting from our invention possess the desirable processing properties so necessary for conjugated diene polymers used in the manufacture of reinforced polystyrene and for making rubber goods such as tires, conveyor belts and hoses.

Although the use of only organolithium initiators for synthesizing non-terminated polymers has been shown in the experimental portion, the scope of the invention covers the use of other organoalkali metal and organomagnesium initiators.

The microstructures of the polymers prepared from conjugated dienes may be modified by employing polar compounds, known in the art, during polymerization. Some examples of polar compounds are: diglyme (dimethyl ether of diethylene glycol), tetrahydrofuran, triethylamine, and N,N,N',N'-tetramethylethylenediamine.

SUMMARY OF THE INVENTION

One aspect of the invention is a process for the preparation of block copolymers of vinyl-substituted aromatic compounds and conjugated dienes of broadened molecular weight distribution comprising:

(a) polymerizing a vinyl-substituted aromatic compound in the presence of an initiator selected from organoalkali metal or organomagnesium initiators until the comsumption of the monomer is substantially complete, (b) adding one or more conjugated diene monomers and polymerizing until substantially complete conversion of monomer(s) to polymer has taken place, and (c) reacting the resulting block copolymer from said steps (a) and (b) with a compound of the general formula

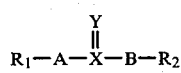

wherein $R_1$ and $R_2$ are same or different and are selected from a hydrocarbyl group containing from 1 to 12 carbon atoms and A, B and Y are oxygen or sulfur, X is carbon or sulfur, with the stipulation that when X is sulfur Y must be oxygen, in an amount of from 0.2 to 3 moles of compound per mole of said organoalkali metal or organomagnesium initiators.

Another aspect of the invention is a process for the preparation of conjugated diene polymers of broadened molecular weight distribution and negligible cold flow comprising:

(a) polymerizing a conjugated diene or a mixture of conjugated dienes in the presence of an initiator selected from organoalkali or organomagnesium initiators until substantially complete consumption of monomer(s) has taken place, and (b) reacting the resulting polymer from said step (a) with a coupling agent of the general formula

wherein $R_1$ and $R_2$ are the same or different and are selected from a hydrocarbyl group containing from 1 to 12 carbon atoms A, B and Y are oxygen or sulfur, X is carbon or sulfur, with the stipulation that when X is sulfur Y must be oxygen, in an amount of from 0.2 to 3 moles of the coupling agent per mole of said organoalkali metal or organomagnesium initiator.

Still another aspect of the invention is conjugated diene polymers of broadened molecular weight distribution and negligible cold flow prepared by (a) polymerizing conjugated dienes in the presence of an initiator selected from an organoalkali metal or organomagnesium initiators until the consumption of monomer is substantially complete, (b) reacting the resulting polymer from said step (a) with a coupling agent of the general formula

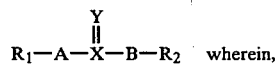 wherein, $R_1$ and $R_2$ are the same or different and are selected from a hydrocarbyl group containing from 1 to 12 carbon atoms, A, B and Y are oxygen or sulfur, X is carbon or sulfur, with the stipulation that when X is sulfur, Y must be oxygen, in an amount of from 0.2 to 3 moles of coupling agent per mole of said organoalkali metal or organomagnesium initiator.

Also included are block copolymers of vinyl-substituted aromatic compounds and conjugated dienes of broadened molecular weight distribution comprising:

(a) polymerizing vinyl-substituted aromatic compounds in the presence of an initiator selected from organoalkali metal or organomagnesium initiators until the consumption of monomer is substantially complete, (b) adding one or more conjugated diene monomers and polymerizing until substantially complete conversion of monomer(s) to polymer has taken place, and (c) reacting the resulting block copolymer from said steps (a) and (b) with a coupling agent of the general formula

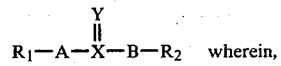 wherein, $R_1$ and $R_2$ are the same or different and are selected from a hydrocarbyl group containing from 1 to 12 carbon atoms and A, B and Y are oxygen or sulfur, X is carbon or sulfur, with the stipulation that when X is sulfur, Y must be oxygen, in an amount of from 0.2 to 3 moles of coupling agent per mole of said organoalkali or organomagnesium initiator.

It is noteworthy that in our invention for the coupling of "living" block copolymers, the hydrocarbon portion of the "living" chain end is always derived from a conjugated diene.

As is well known in the art, the weight ratio or vinyl-substituted aromatic compound to conjugated diene(s) in the "living" block copolymer can be varied widely, for instance, 5:95 to 95:5.

The molecular weight of the non-terminated polymers can be controlled by a judicious selection of the amount of monomers consumed during polymerization and the amount of initiator. The number average molecular weights may vary in the range of 30,000 to 350,000, the preferred range being 60,000 to 200,000.

DETAILED DESCRIPTION OF INVENTION

Generally, the polymers that can be treated by the process of this invention are the living polymers of conjugated dienes containing from 4 to 12 carbon atoms, preferably 4 to 8 carbon atoms, such as 1,3-butadiene, isoprene, 1,3-hexadiene, 1,3-heptadiene, 1,3-octadiene, piperylene, 2-ethyl-1,3-butadiene, 2,3-dimethyl-1,3-butadiene, 2-methyl-1,3-octadiene, 2-methyl-1,3-pentadiene, 4-methyl-1,3-pentadiene, 3-methyl-1,3-pentadiene, 4-methyl-1,3-heptadiene, 2-phenyl-1,3-butadiene and the like. Mixtures of dienes may also be used. The conjugated dienes can be polymerized alone or in mixtures with vinyl-substituted aromatic compounds to form homopolymers, copolymers or block copolymers. Block copolymers can be formed by sequentially polymerizing a vinyl-substituted aromatic compound with an organoalkali metal compound and then adding a conjugated diene compound to produce a block copolymer having a terminal carbon-alkali metal bond which can be subsequently reacted with a coupling agent. Vinyl-substituted aromatic compounds containing 8 to 16 carbon atoms, preferably 8 to 12 carbon atoms can be polymerized with the dienes. Examples of vinyl-substituted aromatic compounds are styrene, α-methyl styrene, p-isopropyl-α-methylstyrene, vinyl toluene, 3-methylstyrene, chlorostyrene, 4-cyclohexylstyrene, 4-p-tolylstyrene, 1-vinylnaphthalene, 2-vinylnaphthalene and the like.

The polymers are prepared by contacting the monomer or monomers in an inert solvent with an organoalkali metal or organomagnesium compound. One of the preferred classes of these compounds can be represented by the formula RLi wherein R is a hydrocarbon radical selected from the group consisting of aliphatic, cycloaliphatic, and aromatic radicals containing from 1 to 20 carbon atoms. Examples of these initiators are methyllithium, n-butyllithium, sec-butyllithium, tert-butyllithium, n-decyllithium, phenyllithium, cyclohexyllithium, p-tolyllithium, n-eicosyllithium, and the like. Another class of initiators is the dilithium initiators such as DiLi-1 ™ and DiLi-3 ™ (Trademarks of Lithium Corporation), 1,4-dilithio-1,1,4,4-tetraphenylbutane, 1,4-dilithio-1,4-dimethyl-2-butene and the like. Examples of other initiators which are useful in this invention are: sodium naphthalene, sodium biphenyl, benzyl sodium, cumyl potassium, cumyl cesium and cumyl rubidium. When employing organosodium, organopotassium, organocesium and organorubidium initiators, it is preferable to use them in an ether solvent such as tetrahydrofuran to avoid side reactions.

It has been found (U.S. Pat. No. 3,822,219) that dialkylmagnesium compounds in combination with organoalkali metal compounds in hydrocarbon solvents catalyze the polymerization of conjugated dienes to predictable molecular weights. Some examples are: n—$C_4H_9MgC_2H_5$—RM and (n—$C_6H_{13})_2Mg$—RM, where M is an alkali metal such as lithium, sodium or potassium, and R is an alkyl or aryl group.

The amount of initiator used varies, depending upon the desired molecular weight of the end product. The polymers are normally prepared at a temperature in the range between $-100°$ and $+150°$ C., preferably $-75°$ and $+75°$ C. It is preferred to carry out the polymerization in the presence of a suitable inert solvent, for instance a hydrocarbon diluent such as benzene, cyclohexane, cyclopentane, n-pentane, hexane, heptane, octane, isooctane, and isopentane.

For environmental reasons, it is preferred that benzene be avoided (limitations on exposure to benzene vapors imposed by the Occupational, Safety and Health Administration). Aliphatic and cycloaliphatic solvents are preferred.

The microstructures of the polymers prepared from conjugated dienes may be modified by employing polar compounds, known in the art, during polymerization.

The general class of coupling agents are linear organic compounds selected from the group of carbonates, thiocarbonates and sulfites of the general formula

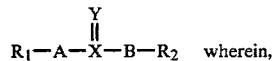

$R_1$—A—X—B—$R_2$ wherein, $R_1$ and $R_2$ may be the same or different and are selected from a hydrocarbyl group containing from 1 to 20 carbon atoms, and A, B and Y are oxygen or sulfur, X is carbon or sulfur, with the stipulation that when X is sulfur, Y must be oxygen. Examples of the coupling agents are: dimethyl carbonate, diethyl carbonate, di-n-propyl carbonate, diisopropyl carbonate, di-n-butyl carbonate, diisobutyl carbonate, di-n-octyl carbonate, dicyclohexyl carbonate, diphenyl carbonate, ethyl phenyl carbonate, di-p-tolyl carbonate, cyclohexyl phenyl carbonate, cyclopentyl butyl carbonate, O,O-diethyl thiocarbonate, O,S-diethyl thiocarbonate, S,S-diethyl dithiocarbonate, O,S-diethyl dithiocarbonate, diethyl trithiocarbonate, diphenyl trithiocarbonate, dimethyl sulfite, diphenyl sulfite, ethyl phenyl sulfite, and mixtures thereof.

The amount of a coupling agent used may be expressed in relation to the amount of polymerization initiator used above the scavenger level, which theoretically corresponds to the number of live polymer ends present in the solution. Generally, the molar ratios of a coupling agent to carbon-metal bond, for example, carbon-lithium bond, useful in this invention are from 0.05:1 to 5:1 preferably 0.2:1 to 3:1.

The coupling agent may be used neat or dissolved in an inert solvent. The reaction with a coupling agent is normally carried out with the solution containing non-terminated polymer. However, for convenience and other considerations, the solution may be further diluted with the solvent used during polymerization or with another desirable inert solvent.

The coupling reaction may be carried out under atmospheric, subatmospheric or supraatmospheric pressures. The reaction temperature may be varied over a wide range, for instance, from about $-50°$ to about $200°$ C. It has been found that a temperature of $0°$ to $100°$ C. is convenient for carrying the coupling reaction.

Cold flow was measured by extruding the polymer through a 1/16 inch orifice under constant pressure at a temperature of $122°$ F. After allowing 10 minutes at $122°$ F. to reach steady state, the rate of extrusion was measured by weighing the amount of polymer extruded in 30 minutes and recording the values in milligrams per minute.

BEST MODE OF THE INVENTION

The practice of this invention is illustrated by reference to the following examples which are intended to be representative rather than restrictive of its scope.

EXAMPLE I

To each of four 8-oz. bottles were charged under high purity nitrogen 5.5 g (0.102 mole) 1,3-butadiene and 161.5 ml benzene. After sparging the solution with nitrogen for two minutes, 0.0560 moles sec-butyllithium initiator (0.30 molar solution in hexane solvent) above the scavenger level was added. The bottle was fitted with a screw cap having a Teflon liner. The polymerizations were allowed to proceed at $25°$ C. for 20 hours. The specified amount of diethyl carbonate was injected (Table I), and the reaction allowed to continue for 24 hours. The resulting polymer solutions were precipitated in five-times the volume of methanol containing 0.1% 2,6-ditert-butyl-p-cresol stabilizer. The conversion and molecular weight data on the dried polymers are shown in Table I. These data demonstrate that the coupling of living polybutadiene with diethyl carbonate yields gel-free polymers having significantly higher molecular weights than their percursor.

TABLE I

| Polymer No. | Molar Ratio $(EtO)_2CO/$ sec-BuLi | Polymer Conversion, % | Inherent Viscosity,[a] dl/g | Increase in Inherent Viscosity, % | % Gel | No.[b] Av. Mol. Wt., $\overline{M}n$ |
|---|---|---|---|---|---|---|
| 1 | 0 (Control) | 87 | 0.86 | — | 0 | 68,600 |
| 2 | 0.5 | 91 | 1.52 | 77 | 0 | 117,000 |
| 3 | 1.0 | 86 | 1.38 | 60.5 | 0 | — |

TABLE I-continued

| Polymer No. | Molar Ratio (EtO)$_2$CO/ sec-BuLi | Polymer Conversion, % | Inherent Viscosity,$^a$ dl/g | Increase in Inherent Viscosity, % | % Gel | No.$^b$ Av. Mol. Wt., $\overline{M}n$ |
|---|---|---|---|---|---|---|
| 4 | 2.0 | 86 | 1.34 | 56 | 0 | — |

$^a$0.1 gram polymer in 100 ml. toluene, 30° C.
$^b$Membrane Osmometer, toluene solvent, 30° C.

EXAMPLE II

To each of three one-quart bottles was charged under nitrogen a solution of 39.0 g (0.720 mole) 1,3-butadiene in 740 ml of benzene. After sparging with nitrogen, 0.264 mmoles sec-butyllithium initiator above the scavenger level was added, and the polymerizations were allowed to proceed for 20 hours at 25° C. The specified amount of diethyl carbonate was injected (Table II), and the reaction allowed to continue for 24 hours. The polymers were isolated by methanol coagulation and dried as in Example 1. The conversion data and physical properties are given in Table II. These data show that coupling of living polybutadiene with diethyl carbonate led to a significant increase in the following properties as compared to the uncoupled polymers: inherent viscosity, no. av. mol. wt., styrene solution viscosity, and Mooney viscosity. Furthermore, polybutadiene coupled with diethyl carbonate exhibited negligible tendency to flow in contrast to the pronounced tendency to flow by the control polymer. The ability of diethyl carbonate coupling agent to increase Mooney viscosity by about 240–350 percent and styrene solution viscosity by 70–170 percent with only about 40 percent increase in number average molecular weight is quite unexpected.

TABLE II

| Polymer No. | Molar Ratio (EtO)$_2$CO/ sec-BuLi | Polymer Conversion, % | Inherent Viscosity,$^a$ dl/g | Increase in Inherent Viscosity, % | % Gel | No. Av. Mol. Wt.,$^b$ $\overline{M}n$ | SSV$^c$ | Mooney Viscosity, ML$_4$ (212° F.) | Cold Flow Index, mg/min |
|---|---|---|---|---|---|---|---|---|---|
| 5 | 0 (Control) | 96 | 1.74 | — | 0 | 135,000 | 49 | 18.5 | 26.6 |
| 6 | 0.5 | 94.5 | 2.65 | 52 | 0 | 191,000 | 135 | 85 | 0.6 |
| 7 | 1.0 | 97 | 2.41 | 38.5 | 0 | 190,000 | 85 | 63.5 | 0.3 |

$^a$Same as in Table I.
$^b$Membrane osmometer, toluene solvent, 30° C.
$^c$Styrene solution viscosity. Relative viscosity of 5 wt % solution of polymer in styrene monomer at 30° C. to that of styrene monomer.

EXAMPLE III

In a manner similar to that in Example I, 5.5 g. (0.102 mole) 1,3-butadiene, 161.5 milliliters of benzene, and 0.10 moles DiLi-3 (dilithium initiator from Lithium Corp. 0.5 molar solution in hexane/triethylamine solvent) above the scavenger level were added to each of two 8-oz. bottles. After polymerization for 20 hours at 25° C. the specified amount of diethyl carbonate (Table III) was injected. After isolation and drying, the polymers exhibited the inherent viscosity data shown in Table III.

TABLE III

| Polymer | Molar Ratio (EtO)$_2$CO/ DiLi-3 | Polymer Conversion, % | Inherent Viscosity, dl/g | Increase In Inherent Viscosity, % | % Gel |
|---|---|---|---|---|---|
| 8 | 0 (Control) | 91 | 1.46 | — | 0 |
| 9 | 2 | 90 | 2.59 | 76 | 0 |

EXAMPLE IV

In a manner similar to that in Example I, 7.3 g. (0.135 mole) 1,3-butadiene, 139 milliliters benzene, and 0.075 millimoles sec-butyllithium above the scavenger level were added to each of three 8-oz. bottles. After polymerization for 24 hours at 25° C., the specified amount of a coupling agent (Table IV) was added, and the reaction allowed to continue at 25° C. for 24 hours. The polymers exhibited the data shown in Table IV. These data show that several linear carbonates are effective coupling agents for living polybutadiene.

TABLE IV

| Polymer | Coupling Agent | Molar Ratio Coupling Agent/BuLi | Polymer Conversion, % | Inherent Viscosity$^a$ dl/g | Increase in Inherent Viscosity, % | % Gel | $\overline{M}w^b$ | $\overline{M}n^b$ | H.I.$^c$ |
|---|---|---|---|---|---|---|---|---|---|
| 10 | none | 0 (control) | 85 | 1.25 | — | 0 | 200,000 | 140,000 | 1.42 |
| 11 | Diethyl carbonate | 0.333 | 89 | 1.75 | 40 | 0 | 280,000 | 192,000 | 1.46 |
| 12 | Diisobutyl carbonate | 0.333 | 83 | 1.48 | 18 | 0 | | | |

$^a$See Table I.
$^b$Weight average and number average molecular weights.
$^c$Heterogeneity Index, $\overline{M}w/\overline{M}n$

EXAMPLE V

If a block copolymer is prepared by the sequential addition of first styrene and then butadiene using sec-butyllithium and is then reacted with diethyl carbonate coupling agent according to the procedure in Example 1, the resulting product would have significantly higher inherent viscosity than the uncoupled precursor block copolymer. The weight ratio of styrene to butadiene can be varied between 5:95 to 95:5. Similarly, the molecular weight of the uncoupled block copolymer can be varied widely by a judicious selection of the amount of monomers undergoing polymerization and the amount of organolithium catalyst.

While certain representative embodiments and details have been shown for the purpose of illustrating the invention, it will be apparent to those skilled in this art that various changes and modifications may be made therein without departing from the spirit or scope of the invention.

We claim:

1. A process for the preparation of conjugated diene polymers of broadened molecular weight distribution and negligible cold flow comprising:
   (a) polymerizing at least one diene in the presence of an initiator selected from organoalkali metal or organomagnesium initiators until the consumption of monomer is substantially complete,
   (b) reacting the resulting polymer from said step (a) with a coupling agent of the general formula

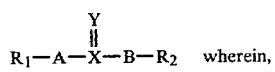 wherein, wherein,
$R_1$ and $R_2$ are the same or different and are selected from a hydrocarbyl group containing from 1 to 12 carbon atoms, A, B and Y are oxygen or sulfur, X is carbon or sulfur, with the stipulation that when X is sulfur, Y must by oxygen, in an amount of from 0.2 to 3 moles of coupling agent per mole of said organoalkali metal or organomagnesium initiator.

2. The process according to claim 1, wherein the conjugated diene is selected from the group consisting of 1,3-butadiene, isoprene, piperylene, 2-ethyl-1,3-butadiene, and 2,3-dimethyl-1,3-butadiene, and the polymerization initiator is an organolithium or an organosodium compound.

3. The process according to claim 1, wherein in the first step (a) the initiator is an organolithium compound and in the second step (b) the coupling agent is selected from the group consisting of dimethyl carbonate, diethylcarbonate, diisobutyl carbonate, diphenyl carbonate, O,O-diethylthiocarbonate, O,S-diethyl thiocarbonate, O,S-diethyl dithiocarbonate, S,S-diethyl dithiocarbonate, diethyltrithiocarbonate, diphenyltrithiocarbonate, dimethylsulfite, and diphenylsulfite.

4. The process according to claim 1, wherein the organolithium initiator is selected from the group consisting of n-butyllithium, sec-butyllithium, phenyllithium, 1,4-dilithio-1,1,4,4-tetraphenylbutane, 1,4-dilithio-1,4-dimethyl-2-butene, DiLi-1 and DiLi-3.

5. The process according to claim 3, wherein the organolithium initiator is selected from the group consisting of n-butyllithium, sec-butyllithium, phenyllithium, 1,4-dilithio-1,1,4,4-tetraphenylbutane, 1,4-dilithio-1,4-dimethyl-2-butene, DiLi-1 and DiLi-3.

6. The process of claim 1 wherein the polymerization initiator is an organolithium compound, the conjugated diene monomer is either butadiene or isoprene, and the coupling agent is diethyl carbonate.

7. Conjugated diene polymers of broadened molecular weight distribution and negligible cold flow prepared by
   (a) polymerizing at least one diene in the presence of an initiator selected from organoalkali metal or organomagnesium initiators until the consumption of monomer is substantially complete,
   (b) reacting the resulting polymer from said step (a) with a coupling agent of the general formula

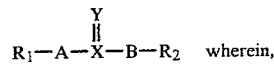 wherein, wherein,
$R_1$ and $R_2$ are the same or different and are selected from a hydrocarbyl group containing from 1 to 12 carbon atoms, A, B and Y are oxygen or sulfur, X is carbon or sulfur, with the stipulation that when X is sulfur, Y must be oxygen, in an amount of from 0.2 to 3 moles of coupling agent per mole of said organoalkali metal or organomagnesium initiator.

8. Polymers according to claim 7, wherein the conjugated diene polymerized is selected from the group consisting of 1,3-butadiene, isoprene, piperylene, 2-ethyl-1,3-butadiene, and 2,3-dimethyl-1,3-butadiene, and the polymerization initiator is an organolithium or an organosodium compound.

9. Polymers according to claim 7, wherein in the first step (a) the initiator is an organolithium compound and in the second step (b) the coupling agent is selected from the group consisting of dimethyl carbonate, diethylcarbonate, diisobutyl carbonate, diphenyl carbonate, O,O-diethyl thiocarbonate O,S-diethyl thiocarbonate, O,S-diethyl dithiocarbonate, S,S-diethyl dithiocarbonate, diethyltrithiocarbonate, diphenyltrithiocarbonate, dimethylsulfite, and diphenylsulfite.

10. Polymers according to claim 7, wherein the polymerization initiator is an organolithium compound, the conjugated diene monomer is either butadiene or isoprene, and the coupling agent is diethyl carbonate.

* * * * *

REEXAMINATION CERTIFICATE (259th)
United States Patent [19]
Lal et al.

[11] B1 4,301,259

[45] Certificate Issued Oct. 2, 1984

[54] LINEAR ORGANO CARBONATE COUPLING AGENTS FOR LIVING POLYMERS OF CONJUGATED DIENES

[75] Inventors: Joginder Lal, Akron; Michael L. Senyek, Tallmadge, both of Ohio

[73] Assignee: The Goodyear Tire & Rubber Company, Akron, Ohio

Reexamination Request:
No. 90/000,404, Jun. 13, 1983

Reexamination Certificate for:
Patent No.: 4,301,259
Issued: Nov. 17, 1981
Appl. No.: 153,122
Filed: May 27, 1980

[51] Int. Cl.$^3$ ................................................ C08F 8/34

[52] U.S. Cl. ................................. 525/343; 525/333.2; 525/353; 525/386

[56] References Cited

U.S. PATENT DOCUMENTS 3,773,732 11/1973 Dillenschneider ................ 260/85.1

*Primary Examiner*—Paul R. Michl

[57] ABSTRACT

New compositions and a process for the preparation of conjugated diene polymers of broadened molecular weight distribution by reacting non-terminated lithium catalyzed conjugated diene polymers with linear organic compounds selected from the group of carbonates, thiocarbonates and sulfites. The resulting new compositions are suitable for use in making high impact plastics and for fabricating rubber goods.

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 7-10 are cancelled.

Claims 1, 3 and 6 are determined to be patentable as amended.

Claims 2, 4 and 5, dependent on an amended claim, are determined to be patentable.

1. A process for the preparation of conjugated diene polymers of broadened molecular weight distribution and negligible cold flow comprising:
   (a) polymerizing at least one diene in the presence of an initiator selected from organoalkali metal or organomagnesium initiators until the consumption of monomer is substantially complete,
   (b) reacting the resulting polymer from said step (a) with a coupling agent of the general formula

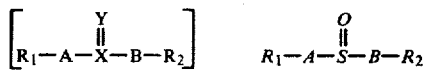

wherein $R_1$ and $R_2$ are the same or different and are selected from a hydrocarbyl group containing from 1 to 12 carbon atoms and A [, B] and [Y] *B* are oxygen or sulfur [, X is carbon or sulfur, with the stipulation that when X is sulfur, Y must be oxygen,] in an amount of from 0.2 to 3 moles of coupling agent per mole of said organoalkali metal or organomagnesium initiator.

3. The process according to claim 1, wherein in the first step (a) the initiator is an organolithium compound and in the second step (b) the coupling agent is selected from the group consisting of [dimethyl carbonate, diethylcarbonate, diisobutyl carbonate, diphenyl carbonate, O,O-diethylthiocarbonate, O,S-diethyl thiocarbonate, O,S-diethyl dithiocarbonate, S,S-diethyl dithiocarbonate, diethyltrithiocarbonate, diphenyltrithiocarbonate,] dimethylsulfite, and diphenylsulfite.

6. The process of claim 1, wherein the polymerization initiator is an organolithium compound *and* the conjugated diene monomer is either butadiene or isoprene [, and the coupling agent is diethyl carbonate].

* * * * *